Oct. 5, 1926.
C. E. McCARTY
1,602,277
WEIGHT OPERATED-CIRCUIT CLOSER
Filed April 12, 1924
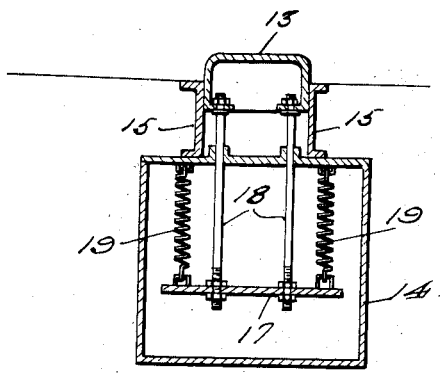
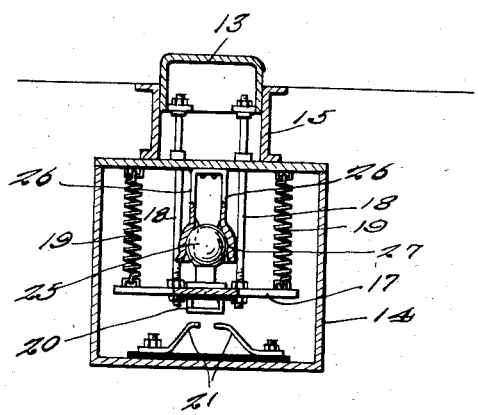
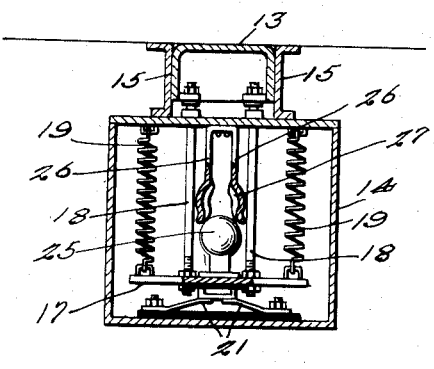
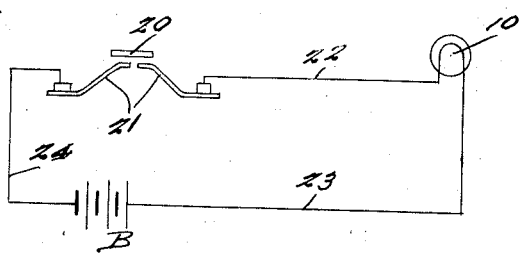
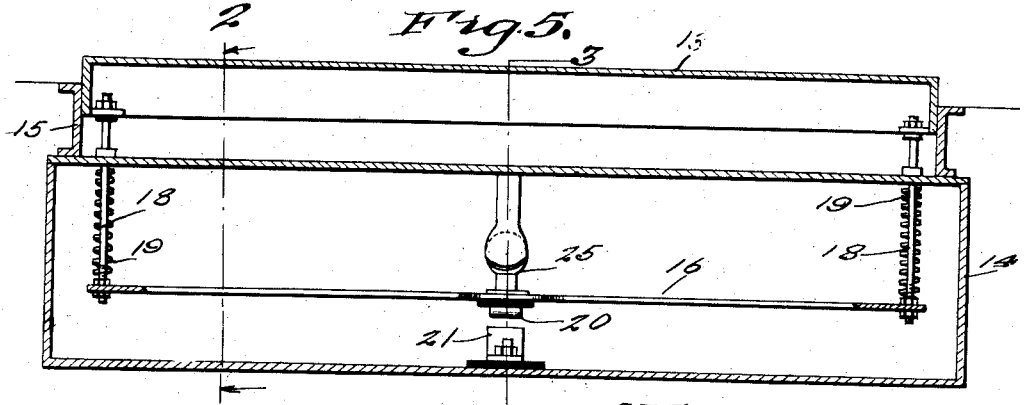
WITNESSES
INVENTOR
C. E. McCarty
BY Victor J. Evans
ATTORNEY Patented Oct. 5, 1926.

1,602,277

UNITED STATES PATENT OFFICE.

CHARLES E. McCARTY, OF HATTIESBURG, MISSISSIPPI.

WEIGHT-OPERATED CIRCUIT CLOSER.

Application filed April 12, 1924. Serial No. 706,210.

This invention relates to improvements in traffic signals, an object being to provide a signal adapted to be placed at the intersection of a roadway, curve or other point of danger and operated by an approaching vehicle to indicate its approach to persons in the vicinity.

Another object of the invention is the provision of novel signal operating means which when actuated will instantly operate a signal and maintain the said signal in active condition for an appreciable period.

With the above and other objects in view, the invention further includes the following novel features and details of construction, to be herinafter more fully described, illustrated in the accompanying drawings and pointed out in the appended claim.

In the drawings:—

Figure 1 is transverse sectional view of a circuit closure constructed in my invention taken on line 2—2 of Figure 5.

Figure 2 is a diagrammatic view of the wiring;

Figure 3 is a similar view on the line 3—3 of Figure 5;

Figure 4 is a view similar to Figure 3 but showing the tread depressed and the switch closed; and Figure 5 is a vertical longitudinal section.

The signal is controlled by a tread 13 which is preferably located transversely of a road way. Located beneath the tread 13 is a housing 14 and rising from this housing are the spaced plates 15 which form guides, said tread 13 which is shown as being substantially channel shaped.

Located within the housing 14 is a horizontally disposed bar 16 which is provided at each end with lateral extensions 17, while secured to and rising from these extensions 17 are vertically disposed rods 18. These rods extend through suitable bearings provided in the housing 14 and are connected to the channel-shaped tread 13. Also secured to the lateral extension 17 of the bar 16 are springs 19, the latter being also secured to the top of the housing 14 and acting to yieldingly hold the tread 13 in elevated position or slightly above the surface of the roadway.

Secured to the lower face of the bar 16 is a contact member 20 and mounted within the housing below the said contact member are spaced spring contact members 21 which are adapted to be bridged by the contact member 20 when the tread is depressed. The contact members 21 are connected in circuit with the lamp 10 and for this purpose a conductor 22 connects the lamp with one of the said members while a conductor 23 connects the lamp with one side of a battery B. The opposite side of the battery B is connected by means of a conductor 24 with the other contact member 21 so that when the tread is depressed and the contact member 20 bridges the contact members 21, current will flow from the battery through these members and the lamp 10 so that the latter will be lighted. Thus, a vehicle travelling along a road way will depress the tread 13 and light the lamp so as to indicate the approach of the vehicle to persons in the vicinity of the intersection of the roadway.

In order that the lamp may remain lighted for an appreciable period after the vehicle has passed over the tread 13, the bar 16 carries an upwardly extending member 25 which is substantially spherical and which is adapted to engage spaced yieldable arms 26 located within the casing in the path of movement of the spherical member 25. The arms 26 are provided with seats 27 which receive the said spherical member, the free ends of the arms being outwardly curved so that the action of springs 19 will force the arms outward by contact of the member 25 therewith so that the said member will enter the seats 27, when the contacts 20 and 31 will be separated.

It will be thus apparent that a vehicle depressing the tread 13 and closing a circuit through the lamp 10 will indicate its approach to the intersection of a roadway, while the action of the spring arms 26 will tend to resist upward movement of the bar 16 and consequently resist separation of the contacts 20 and 21 so that the lamp will remain lighted for an appreciable period.

The invention is susceptible of various changes in its form, proportions and minor details of construction and the right is herein reserved to make such changes as properly fall within the scope of the appended claim.

Having described the invention what is claimed is:—

A device of the class described including a movable tread disposed transversely of a road way, a housing, spaced guide plates extending upwardly from the housing and between which the tread is movable, a horizontally disposed bar parallel with the tread and located within the housing, lateral extensions on each end of the bar, spaced rods connected with each end of the bar and extending upwardly through the top of the housing, means for connecting the upper end of the said bar to the tread, coil springs having one end attached to the ends of the lateral extensions and other ends connected to the top of the housing, spaced yieldable contact members secured to the bottom of the housing, a contact member carried by the bar and adapted to bridge the spaced contact members, said coil springs normally maintaining the bar in a raised position, a spherical member carried by the bar, resilient arms secured to the top of the housing in the path of the spherical member whereby upward movement of the bar will be yieldably resisted and seats provided in the resilient arms for engaging the spherical member to yieldingly hold the bar against downward movement.

In testimony whereof I affix my signature.

CHARLES E. McCARTY.